(12) United States Patent
Zong et al.

(10) Patent No.: US 10,877,591 B2
(45) Date of Patent: Dec. 29, 2020

(54) TOUCH DISPLAY DEVICE AND DRIVING METHOD THEREOF

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Shaolei Zong, Beijing (CN); Jieqiong Wang, Beijing (CN); Jigang Sun, Beijing (CN); Weixing Shan, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/507,287

(22) Filed: Jul. 10, 2019

(65) Prior Publication Data
US 2020/0019271 A1    Jan. 16, 2020

(30) Foreign Application Priority Data
Jul. 10, 2018  (CN) .......................... 2018 1 0751032

(51) Int. Cl.
*G06F 3/041* (2006.01)
*G05F 1/56* (2006.01)
*G06F 3/044* (2006.01)

(52) U.S. Cl.
CPC .............. *G06F 3/0416* (2013.01); *G05F 1/56* (2013.01); *G06F 3/044* (2013.01); *G06F 3/0412* (2013.01)

(58) Field of Classification Search
CPC ...... G06F 3/0416; G06F 3/044; G06F 3/0412; G06F 3/04166; G05F 1/56; G02F 1/134309; G02F 1/13338
See application file for complete search history.

(56) References Cited

U.S. PATENT DOCUMENTS

| | | | |
|---|---|---|---|
| 2013/0147724 A1* | 6/2013 | Hwang | G06F 3/0416 345/173 |
| 2013/0335343 A1* | 12/2013 | Lee | G06F 3/01 345/173 |

(Continued)

*Primary Examiner* — Premal R Patel
(74) *Attorney, Agent, or Firm* — Nath, Goldberg & Meyer; Joshua B. Goldberg; Stephanie F. Majkut

(57) ABSTRACT

There is provided a touch display device, which includes a touch display substrate, a drive circuit and at least one switch circuit. The touch display substrate includes plural common electrode blocks including plural first-shaped common electrode blocks and at least one second-shaped common electrode block. The drive circuit includes plural touch terminals and at least one common voltage output terminal, and each common electrode block is connected to one of the touch terminals through a touch line. Each switch circuit is connected to at least one of the at least one second-shaped common electrode block and a portion of the first-shaped common electrode blocks, and configured to cause the common electrode blocks connected to the switch circuit to be disconnected from (or connected to) each other and disconnected from (or connected to) a respective common voltage output terminal connected to the switch circuit.

20 Claims, 3 Drawing Sheets

(56) References Cited

U.S. PATENT DOCUMENTS

| | | | |
|---|---|---|---|
| 2014/0184543 A1* | 7/2014 | Kim | G06F 3/044 345/173 |
| 2015/0002421 A1* | 1/2015 | Kim | G06F 3/0416 345/173 |
| 2015/0116263 A1* | 4/2015 | Kim | G06F 3/0416 345/174 |
| 2015/0185937 A1* | 7/2015 | Lee | G09G 3/2092 345/173 |
| 2017/0090624 A1* | 3/2017 | Kwon | G06F 3/0416 |
| 2017/0242529 A1* | 8/2017 | Park | G09G 3/20 |
| 2018/0217712 A1* | 8/2018 | Teranishi | G06F 3/0412 |
| 2019/0004626 A1* | 1/2019 | Ko | G06F 3/044 |
| 2019/0042038 A1* | 2/2019 | Lee | G06F 3/0412 |
| 2019/0121476 A1* | 4/2019 | Jang | G09G 3/20 |

\* cited by examiner

TOUCH DISPLAY DEVICE AND DRIVING METHOD THEREOF

CROSS-REFERENCE TO RELATED APPLICATIONS

The present application claims the priority of Chinese Patent Application No. 201810751032.3, filed on Jul. 10, 2018, the contents of which are incorporated herein in their entirety by reference.

TECHNICAL FIELD

The present disclosure relates to the field of touch display technology, and in particular, relates to a touch display device and a driving method for a touch display device.

BACKGROUND

In a case where a touch display substrate of a touch display device has a non-ideal shape (e.g., a non-ideal rectangle), the display function of the touch display device may exhibit display abnormalities such as nonuniform brightness.

SUMMARY

Embodiments of the present disclosure provide a touch display device and a driving method thereof.

According to a first aspect of the present disclosure, there is provided a touch display device, including a touch display substrate including a plurality of common electrode blocks that are insulated from each other and also serve as touch electrodes, wherein the plurality of common electrode blocks include a plurality of first-shaped common electrode blocks having an identical shape and an identical area and at least one second-shaped common electrode block having a shape and/or an area different from that of the plurality of first-shaped common electrode blocks, and a quantity of the plurality of first-shaped common electrode blocks is greater than a quantity of the at least one second-shaped common electrode block;

a drive circuit including a plurality of touch terminals and at least one common voltage output terminal, wherein each of the plurality of common electrode blocks is connected to one of the plurality of touch terminals through a touch line; and at least one switch circuit, each of which is connected to at least one of the at least one second-shaped common electrode block and a portion of the plurality of first-shaped common electrode blocks, wherein each of the at least one switch circuit is configured to cause the common electrode blocks connected to the switch circuit to be disconnected from each other and cause the common electrode blocks connected to the switch circuit to be disconnected from a respective common voltage output terminal connected to the switch circuit, or to cause the common electrode blocks connected to the switch circuit to be connected to each other and to be connected to a respective common voltage output terminal connected to the switch circuit.

In an embodiment, the drive circuit further includes at least one first control terminal connected to the at least one switch circuit, respectively, each of the at least one switch circuit includes a plurality of switching transistors, gates of the plurality of switching transistors of each switch circuit are all connected to a same one of the at least one first control terminal, a first electrode of each of the plurality of switching transistors of each switch circuit is connected to one of the plurality of common electrode blocks, and second electrodes of the plurality of switching transistors of each switch circuit are all connected to a same one of the at least one common voltage output terminal.

In an embodiment, the plurality of switching transistors are on the touch display substrate.

In an embodiment, a quantity of the at least one switch circuit is 1, the drive circuit further includes one first control terminal connected to the switch circuit, and the switch circuit is connected to all of the at least one second-shaped common electrode block and all of the plurality of first-shaped common electrode blocks.

In an embodiment, the touch display substrate includes a first touch detection terminal, a second touch detection terminal, and a second control terminal, the second control terminal is connected to the first control terminal, the switch circuit includes a plurality of switching transistors, gates of the plurality of switching transistors are all connected to the second control terminal, a first electrode of each of the plurality of switching transistors is connected to one of the plurality of common electrode blocks, second electrodes of a portion of the plurality of switching transistors are all connected to the first touch detection terminal, second electrodes of the rest of the plurality of switching transistors are all connected to the second touch detection terminal, and both the first touch detection terminal and the second touch detection terminal are connected to a same one of the at least one common voltage output terminal.

In an embodiment, the touch display device further includes a driver chip, wherein the drive circuit is in the driver chip, and the plurality of touch terminals and the at least one common voltage output terminal are pins of the driver chip.

In an embodiment, the driver chip is bonded to the touch display substrate.

In an embodiment, the touch display device further includes a circuit board bonded to the touch display substrate, wherein the driver chip is bonded to the circuit board, and the plurality of touch terminals and the at least one common voltage output terminal of the driver chip are connected to corresponding positions of the switch circuit through the circuit board.

In an embodiment, in a plan view, each of the plurality of first-shaped common electrode blocks has a rectangular shape.

In an embodiment, in the plan view, each of the at least one second-shaped common electrode block has a substantively rectangular shape, and an area of each of the at least one second-shaped common electrode block is less than an area of each of the plurality of first-shaped common electrode blocks.

In an embodiment, in the plan view, each of the at least one second-shaped common electrode block includes at least one of a rounded corner, a notch, and a through hole.

In an embodiment, the at least one of the at least one second-shaped common electrode block and the portion of the plurality of first-shaped common electrode blocks are connected in parallel to a respective one of the at least one switch circuit.

According to a second aspect of the present disclosure, there is provided a method for driving a touch display device, wherein the touch display device is the touch display device according to claim 1, the method includes steps of in a display stage, controlling each of the at least one common voltage output terminal to output a common voltage, and controlling a corresponding switch circuit to connect the common electrode blocks connected to the switch circuit to the common voltage output terminal connected to the switch circuit; and in a touch stage, controlling each switch circuit to disconnect the common electrode blocks connected to the switch circuit from each other, and to disconnect the common electrode blocks connected to the switch circuit from the common voltage output terminal connected to the switch circuit.

In an embodiment, in the touch display device, a quantity of the at least one switch circuit is 1, the drive circuit further includes one first control terminal connected to the switch circuit, and the switch circuit is connected to all of the at least one second-shaped common electrode block and all of the plurality of first-shaped common electrode blocks;

wherein the touch display substrate includes a first touch detection terminal, a second touch detection terminal, and a second control terminal, the second control terminal is connected to the first control terminal, the switch circuit includes a plurality of switching transistors, gates of the plurality of switching transistors are all connected to the second control terminal, a first electrode of each of the plurality of switching transistors is connected to one of the plurality of common electrode blocks, second electrodes of a portion of the plurality of switching transistors are all connected to the first touch detection terminal, second electrodes of the rest of the plurality of switching transistors are all connected to the second touch detection terminal, and both the first touch detection terminal and the second touch detection terminal are connected to a same one of the at least one common voltage output terminal;

the steps of controlling each of the at least one common voltage output terminal to output a common voltage, and controlling a corresponding switch circuit to connect the common electrode blocks connected to the switch circuit to the common voltage output terminal connected to the switch circuit include a step of outputting, by the first control terminal of the drive circuit, a valid electrical level to turn on the plurality of switching transistors; and the step of controlling each switch circuit to disconnect the common electrode blocks connected to the switch circuit from each other, and to disconnect the common electrode blocks connected to the switch circuit from the common voltage output terminal connected to the switch circuit includes a step of outputting, by the first control terminal of the drive circuit, an invalid electrical level to turn off the plurality of switching transistors.

In an embodiment, the valid electrical level is a turned-on level enabling the plurality of switching transistors to be turned on, and the invalid electrical level is a turned-off level enabling the plurality of switching transistors to be turned off.

In an embodiment, in a case where each of the plurality of switching transistors is an N-type transistor, the turned-on level is a high level, and the turned-off level is a low level.

In an embodiment; in a case where each of the plurality of switching transistors is a P-type transistor, the turned-on level is a low level, and the turned-off level is a high level.

DETAILED DESCRIPTION

To enable one of ordinary skill in the art to better understand the technical solutions of the present disclosure, the present disclosure will be described in detail below with reference to the accompanying drawings and exemplary embodiments.

Figure 3:
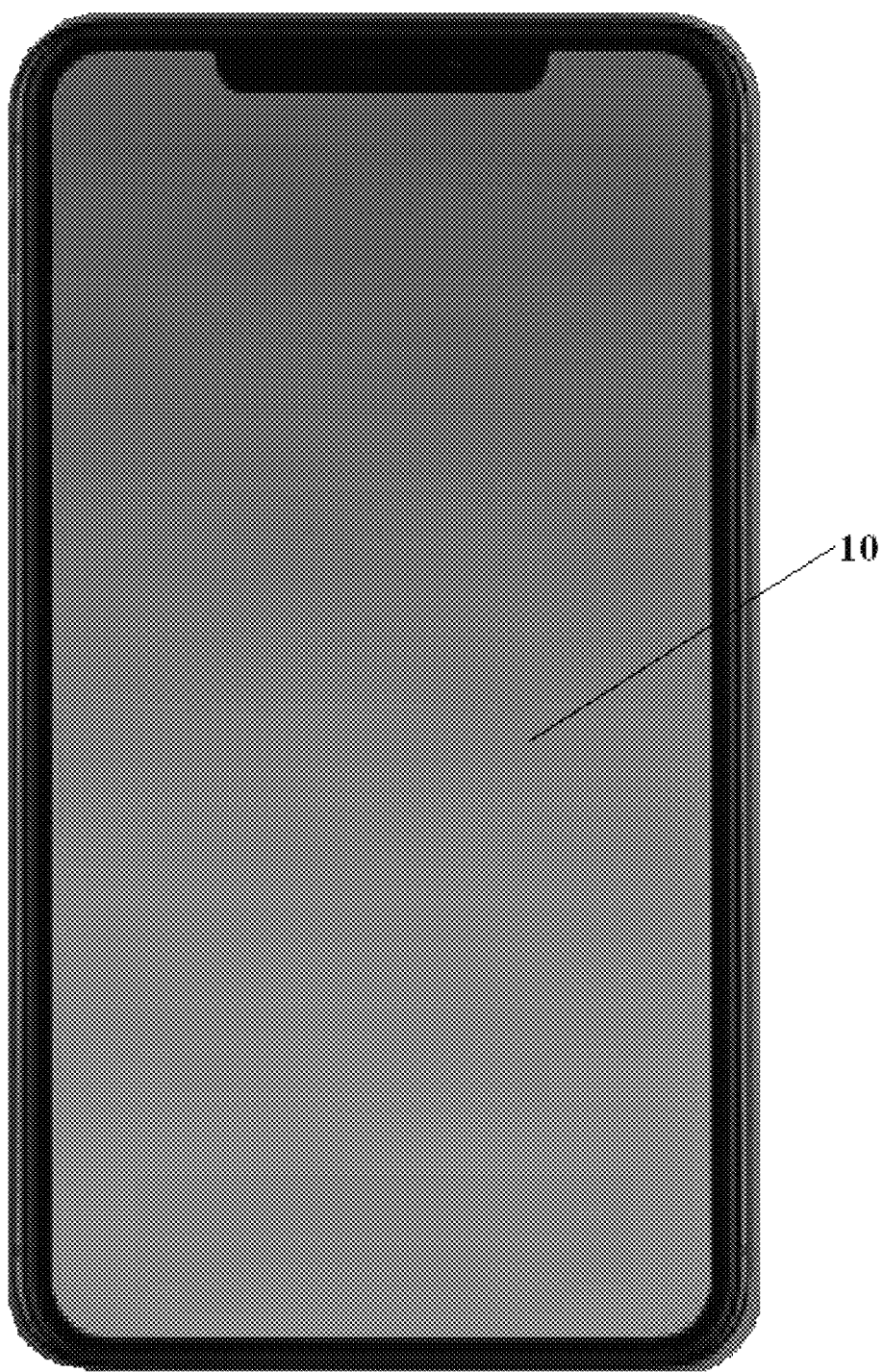
FIG. 3 is a schematic diagram showing a touch display device according to an embodiment of the present disclosure.

FIG. 3 is a schematic diagram showing a touch display device according to an embodiment of the present disclosure. The touch display device includes a touch display substrate 10, and a plurality of common electrode blocks that are insulated from each other are provided in the touch display substrate 10. The touch display device further includes a drive circuit having a plurality of touch terminals provided therein, and each of the touch terminals is connected to one of the common electrode blocks. An operation process of the touch display substrate may include a touch stage and a display stage, and the touch stage and the display stage may time-division multiplex the plurality of common electrode blocks. In the touch stage, the touch terminals output touch detection signals to the respective common electrode blocks or receive touch induced signals from the respective common electrode blocks, such that the common electrode blocks serve as touch electrodes, thereby realizing a touch function. In the display stage, the touch terminals output a common voltage to the respective common electrode blocks, such that the common electrode blocks serve as a common electrode, thereby realizing a display function. The touch stage and the display stage may occur alternately.

With the development of a special-shaped display screen, the touch display substrate of the touch display device may have an irregular shape (e.g., a non-ideal rectangle) due to the presence of a rounded corner, a notch, a through hole, or the like. For example, the touch display substrate 10 of the touch display device shown in FIG. 3 has four corners that are rounded corners, and has a notch at the upper side. As a result, a plurality of common electrode blocks provided on the touch display substrate 10 may have different shapes. For example, most of the plurality of common electrode blocks (e.g., the common electrode blocks located at the central portion of the touch display substrate 10) may have identical shapes (thus these common electrode blocks may be referred to as general-shaped common electrode blocks), while the rest of the plurality of common electrode blocks (e.g., the common electrode blocks located at the corners and the notch of the touch display substrate 10) may have shapes different from that of the most of the plurality of common electrode blocks (thus the rest of the plurality of common electrode blocks may be referred to as special-shaped common electrode blocks). A common voltage output from each of the plurality of touch terminals has an identical driving capacity (e.g., an identical driving voltage). However, the plurality of touch terminals correspond to the plurality of common electrode blocks (i.e., loads) that are different from each other, respectively, causing the common voltages over the respective common electrode blocks of the touch display substrate 10 in the display stage to be nonuniform, thereby resulting in display abnormalities such as nonuniform brightness.

Therefore, it is desirable to provide a touch display device and a method for driving a touch display device that reduce or eliminate the display abnormalities as stated above.

Figure 1:
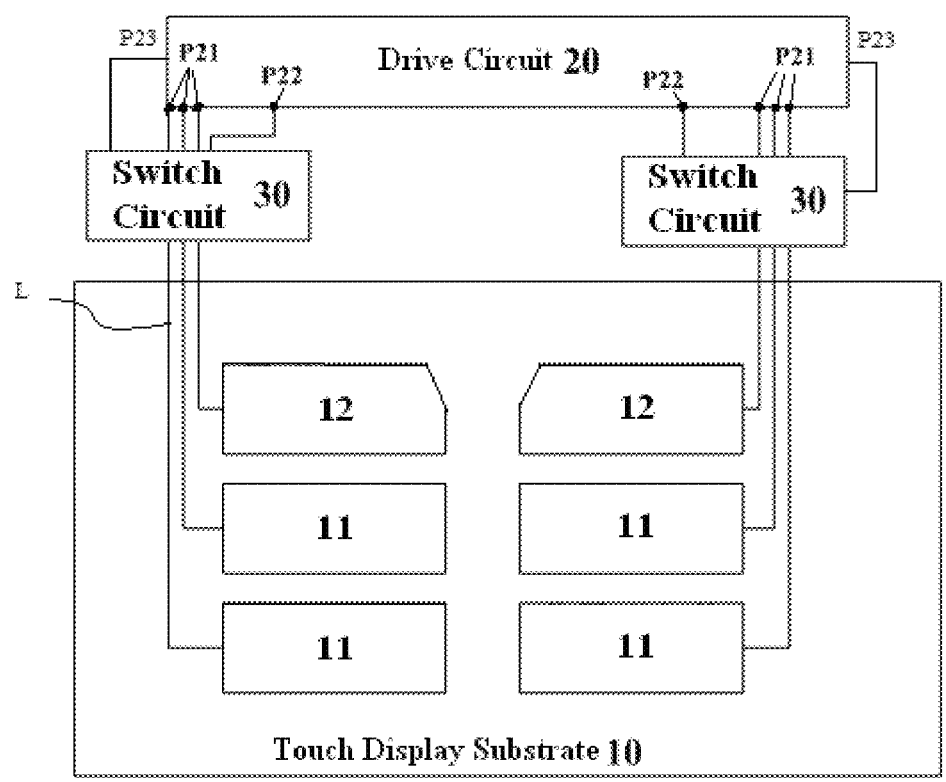
FIG. 1 is a schematic block diagram of a touch display device according to an embodiment of the present disclosure.
Figure 2:
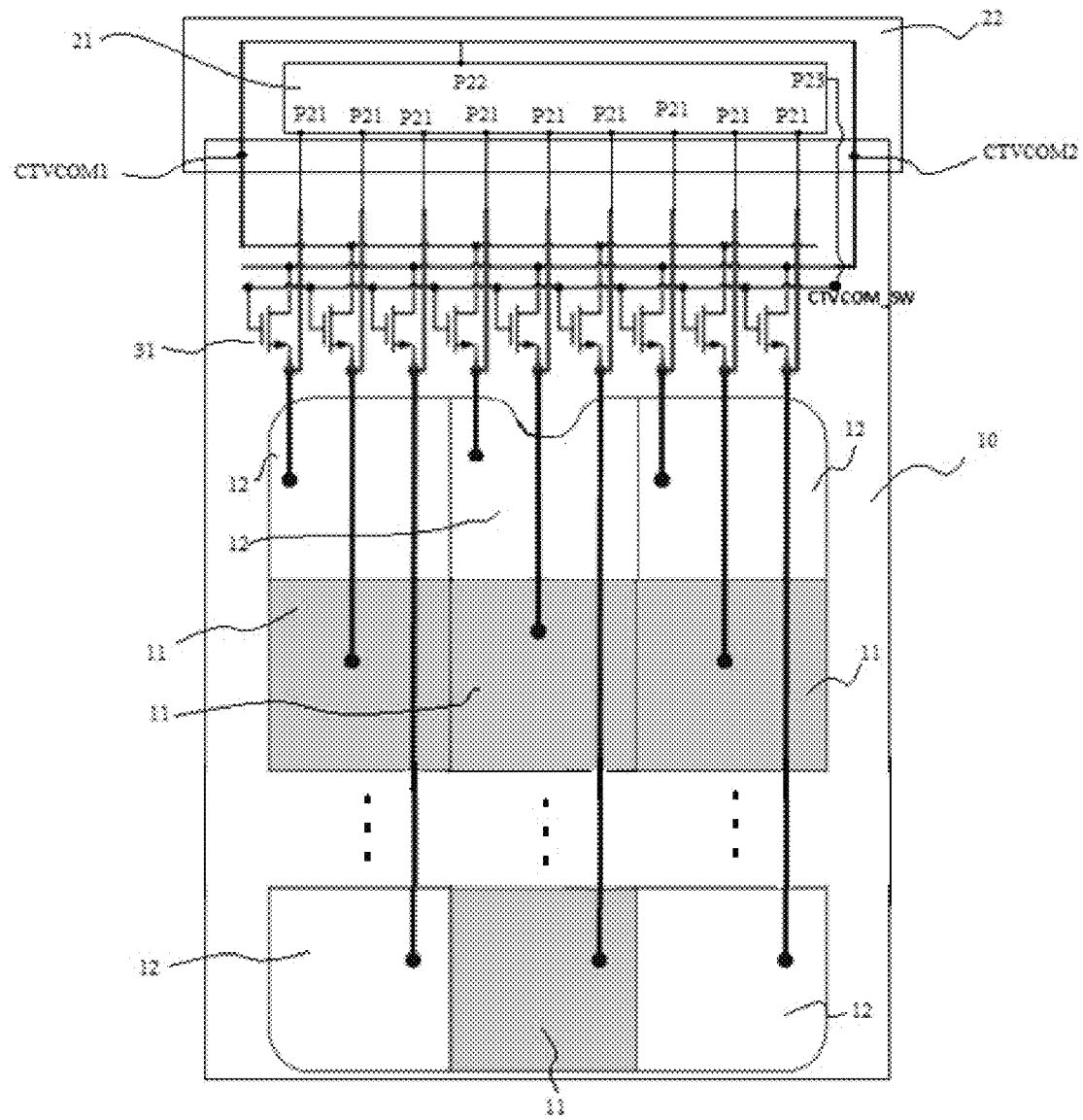
FIG. 2 is a schematic circuit diagram of a touch display device according to an embodiment of the present disclosure.

An embodiment of the present disclosure provides a touch display device, as shown in FIGS. 1 and 2. The touch display device includes a touch display substrate 10. The touch display substrate 10 includes a plurality of common electrode blocks that are insulated from each other and serve as both common electrodes and touch electrodes. The plurality of common electrode blocks include a plurality of general-shaped (e.g. first-shaped) common electrode blocks 11 having an identical shape and an identical area (e.g., in the plan view as shown in FIGS. 1 and 2) and at least one special-shaped (e.g. second-shaped) common electrode block 12 having a shape and/or an area different from that/those of the plurality of general-shaped common electrode blocks 11, and the number of the plurality of general-shaped common electrode blocks 11 is greater than the number of the at least one special-shaped common electrode block 12.

The touch display device may further include a drive circuit 20, which includes a plurality of touch terminals P21 and at least one common voltage output terminal P22. Each of the plurality of common electrode blocks 11 and 12 is connected to one of the plurality of touch terminals P21 through a touch line L. In an embodiment, the plurality of touch terminals P21 may be in one-to-one correspondence with the plurality of common electrode blocks 11 and 12.

The touch display device may further include at least one switch circuit 30, each of which is connected to (or controls or corresponds to) at least one of the at least one special-shaped common electrode block 12 and at least a portion of the plurality of general-shaped common electrode blocks 11. Each of the at least one switch circuit 30 is configured to cause the common electrode blocks 11 and 12 connected to the switch circuit 30 to be disconnected from each other and cause the common electrode blocks 11 and 12 connected to the switch circuit to be disconnected from a respective common voltage output terminal P22 connected to the switch circuit 30, or to cause the common electrode blocks 11 and 12 connected to the switch circuit 30 to be connected to each other and to be connected to a respective common voltage output terminal P22 connected to the switch circuit 30.

For example, each touch terminal P21 of the drive circuit 20 is connected to one common electrode block 11 or 12 through a touch line L. In a display stage, the common electrode blocks 11 and 12 serve as a common electrode to realize a display function. In a touch stage, the common electrode blocks 11 and 12 serve as touch electrodes, respectively, to realize a touch function.

In general, most of the plurality of common electrode blocks 11 and 12 have an identical shape, and are referred to as the general-shaped common electrode blocks 11. The rest (e.g., a small part of) of the plurality of common electrode blocks 11 and 12 have shape(s) different from that of the general-shaped common electrode blocks 11 due to the fact the touch display substrate 10 has a special-shaped boundary, and are referred to as the special-shaped common electrode blocks 12. For example, for ease of description, FIG. 1 schematically illustrates four general-shaped common electrode blocks 11 and two special-shaped common electrode blocks 12. Each of the special-shaped common electrode blocks 12 may have a non-right angle corner. Further, for example, FIG. 2 schematically illustrates an example where the touch display substrate 10 includes N×3 (N>3) common electrode blocks, and the N×3 common electrode blocks are arranged in an array of N rows and 3 columns. As shown in FIG. 2, the touch display substrate 10 may include 4 common electrode blocks 12 (i.e., the 4 common electrode blocks 12 located at the four corners of the touch display substrate 10) each of which has a rounded corner and 1 (one) common electrode block 12 (i.e., the common electrode block 12 located at the middle of row 1) having a notch, and the common electrode blocks 11 (i.e., the common electrode blocks 11 in rows 2 to N−1 and the common electrode block 11 located at the middle of row N) of the touch display substrate 10 may be an identical rectangle (e.g., a square). In this case, one of ordinary skill in the art may define the plurality of common electrode blocks having an ideal rectangular shape as the general-shaped common electrode blocks 11, and define the 4 common electrode blocks each of which has the rounded corner and the one common electrode block having the notch as the special-shaped common electrode blocks 12. However, the present disclosure is not limited thereto. For example, a quantity (i.e., the number) of the columns of the array of the common electrode blocks is not limited to 3, and may be 2, 4 or more. For example, each of the general-shaped common electrode blocks 11 may be a rectangle or any other shape, and each of the special-shaped common electrode blocks 12 may have a recess at its corner(s) and/or have a notch, a through hole, and/or the like therein. In other words, in the plan view shown in FIG. 2, each of the general-shaped common electrode blocks 11 and each of the special-shaped common electrode blocks 12 may have substantively the same shape (e.g., a rectangle), and each of the general-shaped common electrode blocks 11 has a greater area than an area of each of the special-shaped common electrode blocks 12 (or each of the special-shaped common electrode blocks 12 has a smaller area than an area of each of the general-shaped common electrode blocks 11).

Each switch circuit 30 is connected to at least one of the special-shaped common electrode blocks 12 and at least a portion of the general-shaped common electrode blocks 11 and for example, the at least one of the special-shaped common electrode blocks 12 and the at least a portion of the general-shaped common electrode blocks 11 are connected in parallel to the switch circuit 30, Specifically, each switch circuit 30 is configured to, in a touch stage, cause the common electrode blocks 11 and 12 connected to the switch circuit 30 to be disconnected from each other, and to cause the common electrode blocks 11 and 12 connected to the switch circuit 30 to be disconnected from the common voltage output terminal P22 connected to the switch circuit 30, such that the common electrode blocks 11 and 12 connected to the switch circuit 30 may serve as independent touch electrodes to realize a touch function. However, each switch circuit 30 is configured to, in a display stage, cause the common electrode blocks 11 and 12 connected to the switch circuit 30 to be connected to each other and to be connected to a same common voltage output terminal P22 (i.e., the common voltage output terminal P22 connected to the switch circuit 30), such that the common electrode blocks 11 and 12 connected to the switch circuit 30 may serve as a common electrode to realize a display function.

In other words, in the display stage, the at least one of the special-shaped common electrode blocks 12 and the at least a portion of the general-shaped common electrode blocks 11 are connected to each other to form one entity, and are driven by a same common voltage output terminal P22 of the drive circuit 20. Both the connection and disconnection between the common electrode blocks 11, 12 and the connection and disconnection between the common electrode blocks 11, 12 and the drive circuit 20 are controlled by the switch circuit 30. Since the special-shaped common electrode blocks 12 and the general-shaped common electrode blocks 11 are driven by a same common voltage output terminal P22 and are connected to each other, it is possible to ensure that an identical common voltage is applied thereto, thereby increasing the uniformity of display brightness of the touch display substrate 10.

In an embodiment, a quantity (i.e., the number) of the switch circuits 30 may be selected according to a practical application. For example, in the example as shown in FIG. 1, the touch display substrate 10 may include two switch circuits 30, and each of the switch circuits 30 may control one special-shaped common electrode block 12 and two general-shaped common electrode blocks 11.

In an embodiment, the touch display substrate 10 only include one switch circuit 30 (e.g., the switch circuit 30 may include a plurality of switching transistors 31 as shown in FIG. 2), and the switch circuit 30 is connected to all the common electrode blocks 11 and 12. As such, in a display stage, all of the common electrode blocks 11 and 12 may be connected to each other and be connected to a same common voltage output terminal P22, and thus all of the common electrode blocks 11 and 12 may receive an identical common voltage.

It should be noted that, the structure of the switch circuit 30 is not specifically limited herein, as long as the switch circuit 30 can realize the connection and disconnection between the common electrode blocks and the connection and disconnection between the common electrode blocks and the drive circuit 20 as stated above.

In an embodiment, the drive circuit 20 may further include at least one first control terminal P23 connected to a corresponding switch circuit 30. Each switch circuit 30 may include a plurality of switching transistors 31. Gates of the plurality of switching transistors 31 of each switch circuit 30 are all connected to one of the at least one first control terminal P23, a first electrode of each of the plurality of switching transistors 31 of each switch circuit 30 is connected to one common electrode block 11 or 12, and second electrodes of the plurality of switching transistors 31 of each switch circuit 30 are all connected to a same common voltage output terminal P22. For example, each of the switching transistors 31 may be a thin film transistor (TFT). It should be noted that, all of the switching transistors 31 shown in FIG. 2 may form one switch circuit 30. Alternatively, in FIG. 2, the switching transistors 31 whose second electrodes are connected to a first touch detection terminal CTVCOM1 may form one switch circuit 30 as shown in FIG. 1, and the switching transistors 31 whose second electrodes are connected to a second touch detection terminal CTVCOM2 may form another switch circuit 30 as shown in FIG. 1.

For example, the one or two switch circuits 30 may be controlled by a same one of the at least one first control terminal P23, as shown in FIG. 2. Alternatively, one switch circuit 30 may be controlled by a plurality of first control terminals P23, as long as the plurality of first control terminals P23 perform a same operation synchronously on a same timing.

The switching transistors 31 may be provided as a separate device, or may be integrated with the drive circuit 20 in a driver chip 21. As an embodiment, the switching transistors 31 may be provided on the touch display substrate 10. In this case, the switching transistors 31 and other transistors (e.g., TFTs) for the touch function and the display function may be formed synchronously during the formation of the touch display substrate 10, thereby simplifying the manufacturing process thereof.

For example, in a case where the quantity of the switch circuit 30 is 1 (one), and the switch circuit 30 is connected to all of the special-shaped common electrode blocks 12 and all of the general-shaped common electrode blocks 11, the gates of the plurality of switching transistors 31 of the switch circuit 30 are all connected to the same first control terminal P23 (i.e., a quantity of the first control terminal P23 may be 1), the first electrode of each of the switching transistors 31 is connected to one common electrode block 11 or 12, and the second electrodes of the plurality of switching transistors 31 are all connected to the common voltage output terminal P22. That is, all of the special-shaped common electrode blocks 12 and all of the general-shaped common electrode blocks 11 may be connected to each other as one entity, and may be connected to one common voltage output terminal P22 through one switch circuit 30 (which includes the plurality of switching transistors 31 as shown in FIG. 2, for example). Alternatively, all of the special-shaped common electrode blocks 12 and all of the general-shaped common electrode blocks 11 may be disconnected from each other, and may be disconnected from the common voltage output terminal P22.

In an embodiment, as shown in FIG. 2, the touch display substrate 10 may include the first touch detection terminal CTVCOM1, the second touch detection terminal CTVCOM2, and a second control terminal CTVCOM_SW. The quantity of the switch circuit 30 is 1, and the switch circuit 30 includes the plurality of switching transistors 31. The gates of the plurality of switching transistors 31 are all connected to the second control terminal CTVCOM_SW, the first electrode of each of the switching transistors 31 is connected to one common electrode block 11 or 12, the second electrodes of a portion of the switching transistors 31 are all connected to the first touch detection terminal CTVCOM1, and the second electrodes of the rest of the switching transistors 31 are all connected to the second touch detection terminal CTVCOM2. Both the first touch detection terminal CTVCOM1 and the second touch detection terminal CTVCOM2 are connected to the same common voltage output terminal P22.

That is, the second control terminal CTVCOM_SW controls all of the switching transistors 31 to be turned on or turned off. When the switching transistors 31 are turned on, the portion of the common electrode blocks are connected to the common voltage output terminal P22 through the first touch detection terminal CTVCOM1, and the rest of the common electrode blocks are connected to the same common voltage output terminal P22 through the second touch detection terminal CTVCOM2.

In an embodiment, the first touch detection terminal CTVCOM1, the second touch detection terminal CTVCOM2, and the second control terminal CTVCOM_SW may be employed to perform a test before the touch display substrate 10 is delivered from its manufacturer. After the touch display substrate 10 is applied to a touch display device, the first touch detection terminal CTVCOM1, the second touch detection terminal CTVCOM2, and the second control terminal CTVCOM_SW may be configured (e.g., multiplexed) to be ports for controlling the switching transistors 31 to be turned on or turned off as described above.

In an embodiment, the touch display device may further include the driver chip 21. The drive circuit 20 may be provided in the driver chip 21, and the touch terminals P21 and the common voltage output terminal P22 may be pins of the driver chip 21.

That is, the functions of the drive circuit 20 are realized in the driver chip 21, and the connection and disconnection between the common electrode blocks and the connection and disconnection between the common electrode blocks and the drive circuit 20, as described above, are controlled by the driver chip 21.

In an embodiment, the driver chip 21 may be bonded to the touch display substrate 10.

In an embodiment, as shown in FIG. 2, the touch display device may further include a circuit board (e.g., a flexible printed circuit board) 22. The circuit board 22 may be bonded to the touch display substrate 10, and the driver chip 21 may be bonded to the circuit board 22. The touch terminals P21 and the common voltage output terminal P22 of the driver chip 21 (or the drive circuit 20) may be connected to the corresponding positions of the switch circuit 30 through the circuit board 22.

In an embodiment, the touch display device may be any product or component having touch and display functions, such as a liquid crystal touch display module, a mobile phone, a tablet computer, or the like.

An embodiment of the present disclosure provides a method for driving a touch display device, and the method may be applied to the touch display device provided by the foregoing embodiment of the present disclosure. The method may include a display stage and a touch stage.

In the display stage, each of the at least one common voltage output terminal P22 is controlled to output a common voltage, and a corresponding switch circuit 30 is controlled to connect the common electrode blocks 11 and 12 connected to (or controlled by) the switch circuit 30 to the common voltage output terminal P22 connected to the switch circuit 30.

In the touch stage, each switch circuit 30 is controlled to disconnect the common electrode blocks connected to the switch circuit 30 from each other, and to disconnect the common electrode blocks connected to the switch circuit 30 from the common voltage output terminal connected to the switch circuit 30.

That is, in the display stage, the at least one of the special-shaped common electrode blocks 12 and the portion of the general-shaped common electrode blocks 11 are driven by a same common voltage output terminal P22, and thus the uniformity of the common voltage applied thereto is increased, thereby increasing the uniformity of the display brightness.

In the touch stage, all of the common electrode blocks 11 and 12 serve as separate touch electrodes. In this case, the touch terminals P21 of the drive circuit 20 output touch driving signals to a portion or all of the common electrode blocks through the corresponding touch lines L, and detect touch induced signals on the portion or all of the common electrode blocks through the corresponding touch lines L. That is, a self-capacitive touch detection method or a mutual capacitive touch detection method may be employed herein.

In an embodiment, a quantity of the switch circuit 30 is 1 (one), and the switch circuit 30 is connected to all of the special-shaped common electrode blocks 12 and all of the general-shaped common electrode blocks 11. The touch display substrate 10 includes the first touch detection terminal CTVCOM1 the second touch detection terminal CTVCOM2, and the second control terminal CTVCOM_SW. The drive circuit 20 further includes the first control terminal P23 connected to the second control terminal CTVCOM_SW, and the switch circuit 30 includes the plurality of switching transistors 31. The gates of the plurality of switching transistors 31 are all connected to the second control terminal CTVCOM_SW, the first electrode (e.g., a drain) of each of the switching transistors 31 is connected to one common electrode block 11 or 12. The second electrodes (e.g., sources) of a portion of the switching transistors 31 are all connected to the first touch detection terminal CTVCOM1, and the second electrodes of the rest of the switching transistors 31 are all connected to the second touch detection terminal CTVCOM2. Both the first touch detection terminal CTVCOM1 and the second touch detection terminal CTVCOM2 are connected to the same common voltage output terminal P22. For example, the number of the switching transistors 31 may be equal to the number of the common electrode blocks 11 and 12.

The step of controlling each switch circuit 30 to connect the common electrode blocks 11 and 12 connected to the switch circuit 30 to the common voltage output terminal P22 connected to the switch circuit 30 may include: outputting, by the first control terminal P23 of the drive circuit 20, a valid electrical level, such that the plurality of switching transistors 31 are turned on. The valid electrical level may be a turned-on level enabling the plurality of switching transistors 31 to be turned on. In a case of each of the switching transistors 31 being of P type, the valid electrical level may be a low level, and in a case of each of the switching transistors 31 being of N type, the valid electrical level may be a high level.

The step of controlling each switch circuit 30 to cause the common electrode blocks 11 and 12 connected to the switch circuit 30 to be disconnected from each other, and to be disconnected from the common voltage output terminal P22 connected to the switch circuit 30 may include: outputting, by the first control terminal P23 of the drive circuit 20, an invalid electrical level, such that the plurality of switching transistors 31 are turned off. For example, the invalid electrical level may be a turned-off level enabling the plurality of switching transistors 31 to be turned off. In a case of each of the switching transistors 31 being of P type, the invalid electrical level may be a high level, and in a case of each of the switching transistors 31 being of N type, the invalid electrical level may be a low level.

That is, for the touch display substrate 10 of the touch display device shown in FIG. 2 and with the configuration as described above, it only needs to output an invalid voltage to each of the switching transistors 31 in the touch stage, to enable the common electrode blocks 11 and 12 to serve as separate touch electrodes, respectively, in the touch stage; and it only needs to output a valid voltage to each of the switching transistors 31 in the display stage, to enable all of the common electrode blocks 11 and 12 to be connected to each other to form one entity, and to receive an identical common voltage.

It should be noted that, the above embodiments may be combined with each other in a case of no explicit conflict.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:
1. A touch display device, comprising
a touch display substrate comprising a plurality of common electrode blocks that are insulated from each other and also serve as touch electrodes, wherein the plurality of common electrode blocks comprise a plurality of first-shaped common electrode blocks having an identical shape and an identical area and at least one second-shaped common electrode block having a shape and/or an area different from that of the plurality of first-shaped common electrode blocks, and a quantity of the plurality of first-shaped common electrode blocks is greater than a quantity of the at least one second-shaped common electrode block;

a drive circuit comprising a plurality of touch terminals and at least one common voltage output terminal, wherein each of the plurality of common electrode blocks is connected to one of the plurality of touch terminals through a touch line; and at least one switch circuit, each of which is connected to at least one of the at least one second-shaped common electrode block and a portion of the plurality of first-shaped common electrode blocks, wherein each of the at least one switch circuit is configured to cause the common electrode blocks connected to the switch circuit to be disconnected from each other and cause the common electrode blocks connected to the switch circuit to be disconnected from a respective common voltage output terminal connected to the switch circuit, or to cause the common electrode blocks connected to the switch circuit to be connected to each other and to be connected to a respective common voltage output terminal connected to the switch circuit;

wherein the drive circuit further comprises at least one first control terminal connected to the at least one switch circuit, respectively, each of the at least one switch circuit comprises a plurality of switching transistors, gates of the plurality of switching transistors of each switch circuit are all connected to a same one of the at least one first control terminal, a first electrode of each of the plurality of switching transistors of each switch circuit is connected to one of the plurality of common electrode blocks, and second electrodes of the plurality of switching transistors of each switch circuit are all connected to a same one of the at least one common voltage output terminal.

2. The touch display device according to claim 1, wherein the plurality of switching transistors are on the touch display substrate.

3. The touch display device according to claim 1, further comprising a driver chip, wherein the drive circuit is in the driver chip, and the plurality of touch terminals and the at least one common voltage output terminal are pins of the driver chip.

4. The touch display device according to claim 3, wherein the driver chip is bonded to the touch display substrate.

5. The touch display device according to claim 3, further comprising a circuit board bonded to the touch display substrate, wherein the driver chip is bonded to the circuit board, and the plurality of touch terminals and the at least one common voltage output terminal of the driver chip are connected to corresponding positions of the switch circuit through the circuit board.

6. The touch display device according to claim 1, wherein in a plan view, each of the plurality of first-shaped common electrode blocks has a rectangular shape.

7. The touch display device according to claim 6, wherein in the plan view, each of the at least one second-shaped common electrode block has a substantively rectangular shape, and an area of each of the at least one second-shaped common electrode block is less than an area of each of the plurality of first-shaped common electrode blocks.

8. The touch display device according to claim 7, wherein in the plan view, each of the at least one second-shaped common electrode block comprises at least one of a rounded corner, a notch, and a through hole.

9. The touch display device according to claim 1, wherein the at least one of the at least one second-shaped common electrode block and the portion of the plurality of first-shaped common electrode blocks are connected in parallel to a respective one of the at least one switch circuit.

10. A touch display device, comprising a touch display substrate comprising a plurality of common electrode blocks that are insulated from each other and also serve as touch electrodes, wherein the plurality of common electrode blocks comprise a plurality of first-shaped common electrode blocks having an identical shape and an identical area and at least one second-shaped common electrode block having a shape and/or an area different from that of the plurality of first-shaped common electrode blocks, and a quantity of the plurality of first-shaped common electrode blocks is greater than a quantity of the at least one second-shaped common electrode block;

a drive circuit comprising a plurality of touch terminals and at least one common voltage output terminal, wherein each of the plurality of common electrode blocks is connected to one of the plurality of touch terminals through a touch line; and at least one switch circuit, each of which is connected to at least one of the at least one second-shaped common electrode block and a portion of the plurality of first-shaped common electrode blocks, wherein each of the at least one switch circuit is configured to cause the common electrode blocks connected to the switch circuit to be disconnected from each other and cause the common electrode blocks connected to the switch circuit to be disconnected from a respective common voltage output terminal connected to the switch circuit, or to cause the common electrode blocks connected to the switch circuit to be connected to each other and to be connected to a respective common voltage output terminal connected to the switch circuit;

wherein a quantity of the at least one switch circuit is 1, the drive circuit further comprises one first control terminal connected to the switch circuit, and the switch circuit is connected to all of the at least one second-shaped common electrode block and all of the plurality of first-shaped common electrode blocks; and wherein the touch display substrate comprises a first touch detection terminal, a second touch detection terminal, and a second control terminal, the second control terminal is connected to the first control terminal, the switch circuit comprises a plurality of switching transistors, gates of the plurality of switching transistors are all connected to the second control terminal, a first electrode of each of the plurality of switching transistors is connected to one of the plurality of common electrode blocks, second electrodes of a portion of the plurality of switching transistors are all connected to the first touch detection terminal, second electrodes of the rest of the plurality of switching transistors are all connected to the second touch detection terminal, and both the first touch detection terminal and the second touch detection terminal are connected to a same one of the at least one common voltage output terminal.

11. The touch display device according to claim 10, further comprising a driver chip, wherein the drive circuit is in the driver chip, and the plurality of touch terminals and the at least one common voltage output terminal are pins of the driver chip.

12. The touch display device according to claim 11, wherein the driver chip is bonded to the touch display substrate.

13. The touch display device according to claim 11, further comprising a circuit board bonded to the touch display substrate, wherein the driver chip is bonded to the circuit board, and the plurality of touch terminals and the at least one common voltage output terminal of the driver chip are connected to corresponding positions of the switch circuit through the circuit board.

14. The touch display device according to claim 10, wherein in a plan view, each of the plurality of first-shaped common electrode blocks has a rectangular shape.

15. The touch display device according to claim 14, wherein in the plan view, each of the at least one second-shaped common electrode block has a substantively rectangular shape, and an area of each of the at least one second-shaped common electrode block is less than an area of each of the plurality of first-shaped common electrode blocks.

16. The touch display device according to claim 15, wherein in the plan view, each of the at least one second-shaped common electrode block comprises at least one of a rounded corner, a notch, and a through hole.

17. A method for driving a touch display device, wherein the touch display device comprises
- a touch display substrate comprising a plurality of common electrode blocks that are insulated from each other and also serve as touch electrodes, wherein the plurality of common electrode blocks comprise a plurality of first-shaped common electrode blocks having an identical shape and an identical area and at least one second-shaped common electrode block having a shape and/or an area different from that of the plurality of first-shaped common electrode blocks, and a quantity of the plurality of first-shaped common electrode blocks is greater than a quantity of the at least one second-shaped common electrode block;
- a drive circuit comprising a plurality of touch terminals and at least one common voltage output terminal, wherein each of the plurality of common electrode blocks is connected to one of the plurality of touch terminals through a touch line; and
- at least one switch circuit, each of which is connected to at least one of the at least one second-shaped common electrode block and a portion of the plurality of first-shaped common electrode blocks, wherein each of the at least one switch circuit is configured to cause the common electrode blocks connected to the switch circuit to be disconnected from each other and cause the common electrode blocks connected to the switch circuit to be disconnected from a respective common voltage output terminal connected to the switch circuit, or to cause the common electrode blocks connected to the switch circuit to be connected to each other and to be connected to a respective common voltage output terminal connected to the switch circuit;
- the method comprises steps of
- in a display stage, controlling each of the at least one common voltage output terminal to output a common voltage, and controlling a corresponding switch circuit to connect the common electrode blocks connected to the switch circuit to the common voltage output terminal connected to the switch circuit; and
- in a touch stage, controlling each switch circuit to disconnect the common electrode blocks connected to the switch circuit from each other, and to disconnect the common electrode blocks connected to the switch circuit from the common voltage output terminal connected to the switch circuit;
- wherein in the touch display device, a quantity of the at least one switch circuit is 1, the drive circuit further comprises one first control terminal connected to the switch circuit, and the switch circuit is connected to all of the at least one second-shaped common electrode block and all of the plurality of first-shaped common electrode blocks;
- wherein the touch display substrate comprises a first touch detection terminal, a second touch detection terminal, and a second control terminal, the second control terminal is connected to the first control terminal, the switch circuit comprises a plurality of switching transistors, gates of the plurality of switching transistors are all connected to the second control terminal, a first electrode of each of the plurality of switching transistors is connected to one of the plurality of common electrode blocks, second electrodes of a portion of the plurality of switching transistors are all connected to the first touch detection terminal, second electrodes of the rest of the plurality of switching transistors are all connected to the second touch detection terminal, and both the first touch detection terminal and the second touch detection terminal are connected to a same one of the at least one common voltage output terminal;
- the steps of controlling each of the at least one common voltage output terminal to output a common voltage, and controlling a corresponding switch circuit to connect the common electrode blocks connected to the switch circuit to the common voltage output terminal connected to the switch circuit comprise a step of outputting, by the first control terminal of the drive circuit, a valid electrical level to turn on the plurality of switching transistors; and
- the step of controlling each switch circuit to disconnect the common electrode blocks connected to the switch circuit from each other, and to disconnect the common electrode blocks connected to the switch circuit from the common voltage output terminal connected to the switch circuit comprises a step of outputting, by the first control terminal of the drive circuit, an invalid electrical level to turn off the plurality of switching transistors.

18. The method according to claim 17, wherein the valid electrical level is a turned-on level enabling the plurality of switching transistors to be turned on, and the invalid electrical level is a turned-off level enabling the plurality of switching transistors to be turned off.

19. The method according to claim 18, wherein in a case where each of the plurality of switching transistors is an N-type transistor, the turned-on level is a high level, and the turned-off level is a low level.

20. The method according to claim 18, wherein in a case where each of the plurality of switching transistors is a P-type transistor, the turned-on level is a low level, and the turned-off level is a high level.

* * * * *